April 5, 1932.  J. P. RATIGAN  1,852,477
CLAMP FOR SUCKER RODS AND THE LIKE
Filed Oct. 6, 1930
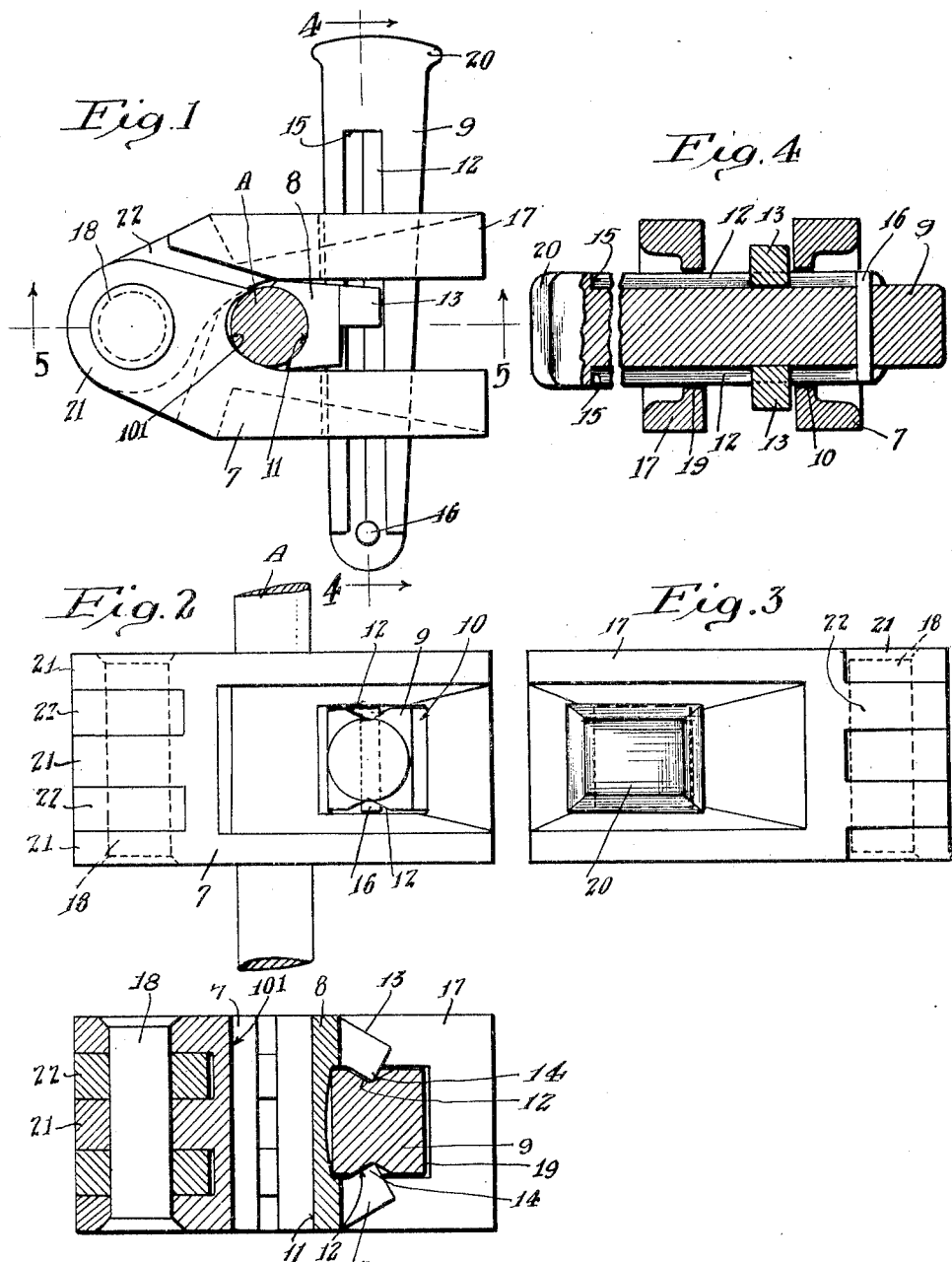
Inventor
James P. Ratigan
By Lyon & Lyon
Attorney Patented Apr. 5, 1932

1,852,477

UNITED STATES PATENT OFFICE

JAMES P. RATIGAN, OF LOS ANGELES, CALIFORNIA

CLAMP FOR SUCKER RODS AND THE LIKE

Application filed October 6, 1930. Serial No. 486,688.

This invention relates to clamps of the type employed for holding sucker rods and the like, and one of the important objects of the invention is to provide a clamp of this type in which the various elements cannot be accidentally disassociated, thus minimizing the liability of losing any of the parts of the clamp.

This clamp employs the wedge principle and the wedge operates against a follower or jaw and against another jaw so as to force the jaws together.

Other objects and advantages of the invention will appear in the subjoined detailed description.

The accompanying drawings illustrate the invention:

Figure 1 is a plan view of a clamp constructed in accordance with the provisions of this invention, the parts being shown in clamping positions.

Figure 2 is a front elevation of Figure 1.

Figure 3 is a rear elevation of Figure 1.

Figure 4 is a vertical section on the line indicated by 4—4, Fig. 1, the wedge member being broken to contract the view.

Figure 5 is a section on the line indicated by 5—5, Fig. 1.

Referring to the drawings, there are provided two jaws 7, 8 and a wedge member 9 that engages the outer face of the jaw 8 and passes through an opening 10 in the jaw 7. The jaw 7 has a recessed face 101 to approximately fit the sucker rod or other member A that is being clamped.

The jaw 8 and wedge member 9, preferably, are slidably connected and this is effected, in this instance, by providing the wedge member with longitudinally extending grooves 12 in its upper and lower faces and providing the jaw 8 with lugs 13 that project loosely into the grooves 12. In this instance the grooves 12 are V-shaped in cross section and the lugs 13 are provide with V-shaped portions 14 that more or less conform to the shape of the grooves. Both ends of the grooves are closed, as indicated at 15, 16. In this instance, the closure 16 is a pin or pins that project from the wedge member 9 into one end portion of the grooves.

Thus, it will appear, that after the jaw 8 and wedge member 9 are assembled, they cannot be accidentally disassembled, the wedge member always being so associated with the jaw 8 as to be readily moved to and from position where it wedges the jaw 8 toward the recessed face 101 of the jaw 7.

The wedge member 9 is carried by a member or carrier 17 which is movably connected with the jaw 7, being pivoted at 18 to said jaw. The pivot 18 is parallel to the rod A, thus enabling the jaw 7 and carrier 17 to be swung outwardly from the rod A or inwardly toward said rod, according as the rod is to be removed from the clamp or clamped therein.

The carrier 17 is provided with an opening 19 that, when the jaw 7 and carrier 17 are closed together, substantially registers with the opening 10. Thus, the wedge member 9 may be thrust through the carrier 17 and through the jaw 7 and when so positioned the jaw 8 is between the rod A and the wedge 9, the inner face of the wedge bearing against the outer face of the jaw 8, while the outer face of the wedge 9 bears against the outer walls of the openings 10, 19. The farther the wedge 9 is thrust through the jaw 7, the farther will the jaw 8 be thrust toward the clamping face 101 of the jaw 7.

The large end of the wedge member 9 terminates in a head 20 of greater size than the opening 19 so that the wedge member cannot become accidentally disassociated from the carrier 17. In this instance the pivot 18 passes through ears 21 of the jaw 7 and through ears 22 of the carrier 17, there being three of the former and two of the latter, but any other suitable arrangement is permissible.

The invention hereinbefore described operates as follows: Assuming that the jaw 7 and carrier 17 are swung apart into open position and that the wedge member 9 is retracted to a position in which the smaller end of said wedge member is in engagement with the lugs 13 of the jaw 8 and is disengaged from the jaw 7, thus spacing one side of the jaw 8 a sufficient distance from the jaw 7 to permit of the rod, that is to be clamped, passing through said side and the jaw 7, the clamp will be moved towards said rod so that said rod will pass between the jaws 7, 8 and engage the jaw-face 101. Then, the jaw 7 and carrier 17 will be swung toward one another to close them, thus positioning the jaw 8 opposite to the jaw-face 101. Then the wedge member 9 will be pushed through the carrier 17 so as to cause the smaller end of the wedge member to pass into the opening 10 in the jaw 7. The wedge member 9 will be thrust sufficiently far through the openings 10, 19, to cause the rear face of the wedge member to engage the rear walls of said openings when the rod A is firmly gripped between the jaw-faces 101, 11. Any desired gripping pressure of the jaws 7, 8 may be exerted upon the rod A by forcing the wedge member farther into the openings 10, 19. The clamping effect may be increased considerably by striking the head 20 of the wedge member with a hammer or sledge.

To release the rod A from the clamp, a reversal of the foregoing described operations will be performed.

It is to be noted, particularly, that the operation of the clamp is very simple and that, when the clamp is open and the wedge 9 retracted as far as possible, all of the parts of the clamp remain connected so that none of the movable parts can be lost and so that the movable parts are always in such positions as to make it possible to speedily clamp a polish rod or the like.

I claim:

1. A clamp for sucker rods and the like comprising jaws, a carrier pivotally associated with one of the jaws, and a wedge member slidably engaging the jaws and the carrier.

2. A clamp for sucker rods and the like comprising jaws, a carrier movably associated with one of the jaws, and a wedge member slidably interlocked with the other jaw and shiftably engaging the first mentioned jaw and the carrier.

3. A clamp for sucker rods and the like comprising jaws, one of the jaws provided with an opening, a carrier movably connected with said one jaw and provided with an opening adapted to register with the first mentioned opening, and a wedge member slidably interlocked with the other jaw and shiftably mounted in one of the openings and shiftable into and from the other opening.

4. A clamp for sucker rods and the like comprising hingedly connected members provided with transverse openings, one of said members provided with a concave face, a wedge member shiftably mounted in one of the openings and shiftable into and from the other opening, a jaw slidably interlocked with the wedge member and operated toward said concave face by movement of the wedge member in one direction, and a means on the wedge member engageable with the jaw when the wedge member is moved in the opposite direction to prevent separation of said jaw and wedge member.

5. A clamp for sucker rods and the like comprising two members, one constituting a wedge member and the other a jaw, a groove in one of said members, a lug projecting from the other member into said groove, the lug and groove related to permit of longitudinal movement of the wedge member, a second jaw provided with an opening to receive the wedge member, and a member hingedly connected with the second jaw and provided with an opening, the wedge member being mounted in the last mentioned opening.

6. A clamp for sucker rods and the like comprising hingedly connected members, one constituting a jaw, a second jaw between said members and opposed to a clamping face on the first jaw, and a wedge member having one face engaging the second jaw and having its opposite face engageable with said members, said wedge member being shiftably carried by one of said members.

7. A clamp for sucker rods and the like comprising hingedly connected members, one constituting a jaw, a second jaw between said members and opposed to a clamping face on the first jaw, a wedge member having one face engaging the second jaw and having its opposite face engageable with said members, said wedge member being shiftably carried by one of said members, and means loosely interlocking the second jaw and the wedge member.

8. A clamp for sucker rods and the like comprising hingedly connected members, one constituting a jaw, a second jaw between said members and opposed to a clamping face on the first jaw, a wedge member having one face engaging the second jaw and having its opposite face engageable with said members, said wedge member being shiftably carried by one of said members, means loosely interlocking the second jaw and the wedge member, and means on the wedge member engageable with the second jaw to prevent separation of the second jaw and wedge member when the wedge member is withdrawn from engagement with the other of the hingedly connected members.

Signed at Los Angeles, California, this 29th day of September, 1930.

JAMES P. RATIGAN.